United States Patent [19]

Glomb et al.

[11] 4,043,547

[45] Aug. 23, 1977

[54] PRECISION MACHINE VISE

[75] Inventors: Frank A. Glomb, Thornton; William S. Griffith, Chicago, both of Ill.

[73] Assignee: Chicago Tool and Engineering Company, Chicago, Ill.

[21] Appl. No.: 749,229

[22] Filed: Dec. 10, 1976

[51] Int. Cl.² .................. B23Q 3/02

[52] U.S. Cl. .................. 269/136; 269/244

[58] Field of Search .................. 269/134–138, 269/244

[56] References Cited

U.S. PATENT DOCUMENTS 3,397,880 8/1968 Kuban .................. 269/134

*Primary Examiner*—Gary L. Smith

*Assistant Examiner*—Robert C. Watson

*Attorney, Agent, or Firm*—Leydig, Voit, Osann, Mayer & Holt, Ltd.

[57] ABSTRACT

A precision machine vise having fixed and movable jaws, the movable jaw being actuated by a traveling nut having a lug which extends into a recess formed in the movable jaw. The lug and movable jaw having opposed force-transmitting surfaces which are angled downwardly and which have a preloaded spring interposed between them so that force is resiliently applied both to a work piece between the jaws and to the horizontal way surfaces which support the movable jaw. The spring provides slight articulation of the movable jaw with respect to the traveling nut permitting self-alignment of the jaw with the engaged surface of the work piece. The spring, because of its preload, causes the movable jaw to bear resiliently against the horizontal way surfaces even prior to engagement of the work piece. The preloaded spring serves, in addition, to preclude any play between the lug and the movable jaw or any looseness in the drive system which might develop during the life of the device. The spring is preferably of the type having a spring rate which increases with deflection, a spring washer formed into shallow cup shape, commonly referred to as a bellville washer, being employed.

9 Claims, 9 Drawing Figures

PRECISION MACHINE VISE

DESCRIPTION OF THE INVENTION

Machine vises are known having a movable jaw which is self-aligning with respect to an engaged work piece and which, in addition, is held in engagement with the supporting way surfaces with a force which varies in accordance with clamping force. An example of such a construction is shown in the Muggli et al. U.S. Pat. No. 2,880,638 which employs sloping surfaces with an interposed hemispherical insert to accommodate self-alignment. However, in such vises the movable jaw is loose with respect to the supporting way surfaces until after clamping force begins to be built up. This runs the risk that the work piece will unwantedly shift in its position simply as a result of tightening the screw.

It is a general object of the invention to overcome this as well as other limitations and disadvantages of prior construction.

This it is an object of the present invention to provide a precision machine vise in which there is automatic self-alignment but in which there is a light but effective hold-down force upon the movable jaw, to keep it intimately seated on the way surfaces, both before and during initial clamping engagement of the work piece. More specifically, it is an object to provide a precision machine vise in which the movable jaw brings force resiliently to bear both against a work piece and against the supporting way surfaces but in which the seating force against the way surfaces is constantly effective, never dropping to zero even when the movable jaw is fully backed off.

It is a related object to provide a structure employing a preloaded spring for transmitting clamping force to a movable jaw and to achieve more even distribution of clamping pressure, the spring, in addition, having a self-centering effect upon the movable jaw so that it is maintained in a fully seated and nominally centered position until the work piece is engaged, following which the jaw is free to rock slightly about a vertical axis into a condition of self-alignment with the work piece without any relative vertical movement at the way surfaces.

It is another object of the invention to provide a machine vise which includes a preloaded spring as a force transmitting element so that the work piece may be initially engaged with a relatively light resilient force permitting relative shifting of the work piece, e.g., by tapping, into final position, following which the screw may be turned tight for applying powerful, yet resilient, clamping pressure. In this condition, it is an object of the invention to employ an interposed preloaded spring, for example, of the "bellville" or cupped washer type, preferably a spring in which the rate is not constant but rises, with increased deflection, to produce a sharply rising curve of clamping force.

It is yet another, and related, object to provide a precision machine vise employing a movable jaw having a recess in its underside presenting a force transmitting surface in the path of movement of a lug on a traveling nut but which includes an interposed spring which is preloaded by a set screw engaging the opposite side of the lug, the preload precluding the development of any looseness, even over the life of the device, between the movable jaw and the nut which drives it.

It is a general object of the invention to provide a precision machine vise which, in addition to having the features set forth above, is inherently simple and economical and is easily operated, having a long, useful life normally free of any necessity for periodic maintenance or adjustment but which may be easily disassembled for cleaning and the like.

Other objects and advantages of the invention will become apparent upon reading the attached detailed description and upon reference to the drawings, in which.

While the invention has been described in connection with a preferred embodiment, it will be understood that we do not intend to be limited to the particular embodiment shown but intend, on the contrary, to cover the various alternative and equivalent constructions included within the scope of the appended claims.

Figure 1:
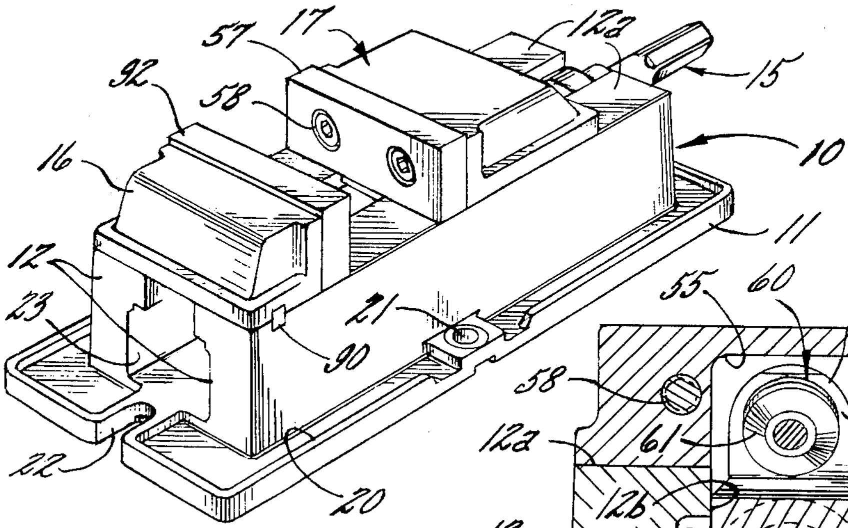
FIG. 1 is a perspective view of a vise constructed in accordance with the present invention.
Figure 2:
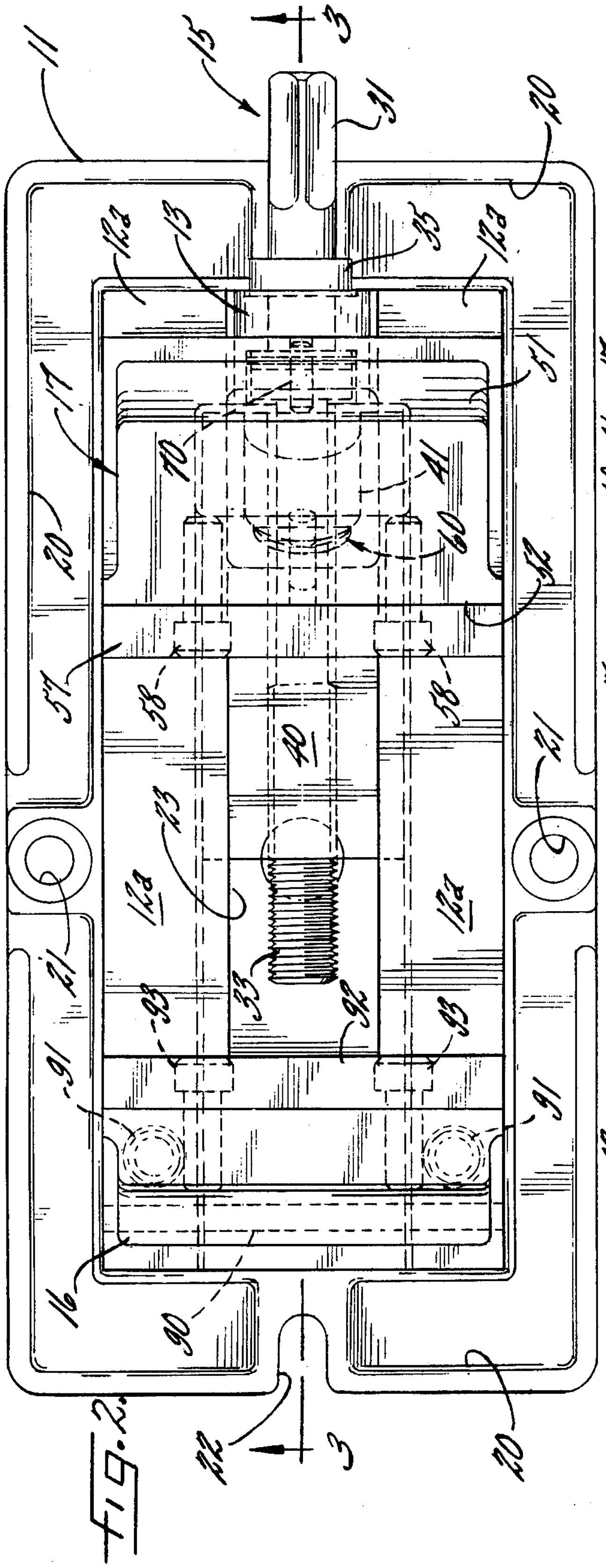
FIG. 2 is a top view corresponding to FIG. 1.
Figure 3:
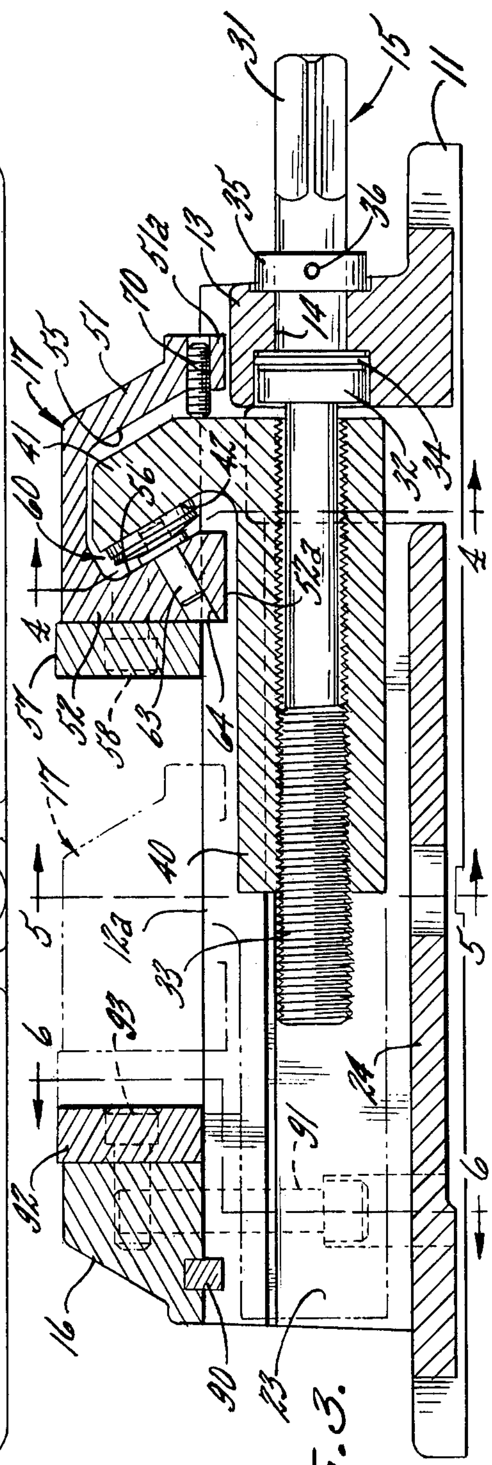
FIG. 3 is a transverse section looking along line 3—3 in FIG. 2.

Referring primarily to FIGS. 1–3 there is shown a machine vise having a frame 10 including a flat base 11. Integral with the base are a pair of spaced, parallel rails 12 having way surfaces **12*a*, 12*b*, 12*c* (see also FIG. 4). Interconnecting the rails at the operating end thereof is an integral wall or cross member 13 having a central opening 14 fitted with a horizontally extending jack screw 15. Mounted at the other end of the rails 12, and in bridging position, is a stationary jaw 16. Also in bridging position, and mounted for movement along the rails, is a movable jaw 17.**

Turning attention to the base 11, it will be seen (FIGS. 1 and 2) that it includes a peripheral reinforcing flange 20 which is penetrated by openings 21 at the sides, and openings 22 at the ends, for clamping the base to the flat reference surface. The spaced rails 12 and the floor 24 which extends between them, define a central opening 23 through which the jack screw extends. The base, the rails, and the interconnecting wall and floor structure are all formed integrally and inexpensively as a single casting.

Focusing attention upon the jack screw 15, it will be seen (FIG. 3) that it includes an outer end 31, which may be squared or otherwise shaped for applying a wrench or other tool, a central flange or shoulder 32, and a shank 33 threaded with a square or similar thread. Interposed between the flange 32 and the wall 33 is a roller type thrust washer 34. For maintaining the jack screw captive in the wall 13, a collar 35 is used which is held in place on the shaft by a suitable set screw 36.

Figure 4:
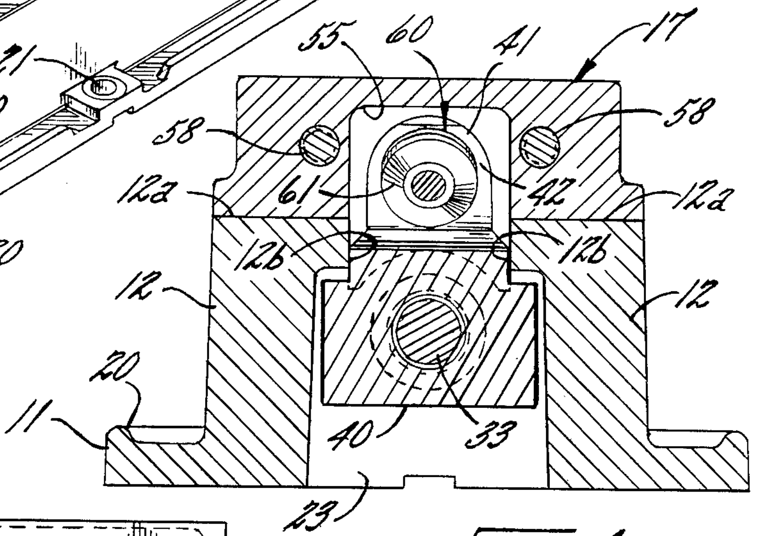
FIG. 4 is a vertical section taken along line 4—4 in FIG. 3.
Figure 5:
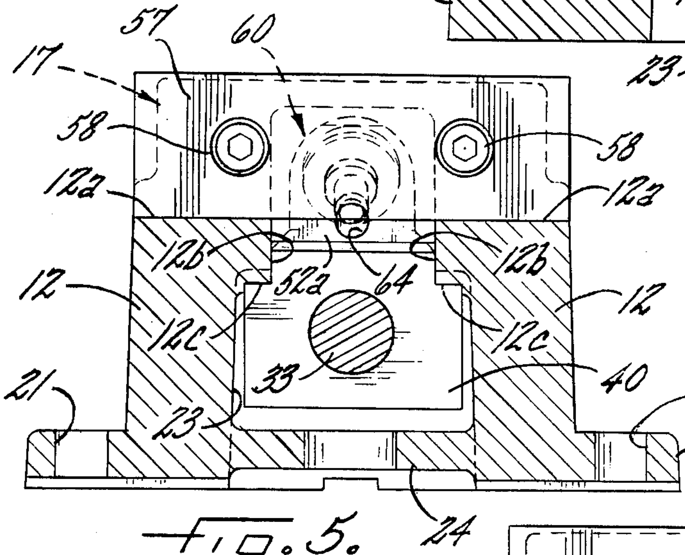
FIG. 5 is a vertical section taken along line 5—5 in FIG. 3.

For the purpose of driving the movable jaw 17 a traveling nut 40 is provided which is internally threaded for engaging the shank of the jack screw and which is movable backwardly and forwardly thereon in the central space 23. As shown in FIGS. 4 and 5, the traveling nut is formed with longitudinal way surfaces at right angles to one another for mating with the way surfaces **12*b*, 12*c* on the rails. At its forward end, the traveling nut 40 has a rigid upwardly extending lug 41 which is preferably formed integrally with the nut and which has a flat rearwardly facing force transmitting surface 42 of arcuate profile (FIG. 4**).

Turning attention to the movable jaw 17, it will be seen that it is of inverted box-like construction having a forwardly facing wall 51, a rearwardly facing wall 52 and side walls 53, 54 (see FIG. 4) which rest upon the way surfaces **12*a* of the rails. To provide guidance of the movable jaw in the lateral direction, the front wall 51 has a dependent portion 51*a* and the rear wall 52 has a dependent portion 52*a* for riding between the opposed way surfaces 12*b* of the rails with a small amount of intentional clearance. The walls, taken together, define a recess 55, extending inwardly from the under side, into which the lug 41 of the traveling nut projects. The rear wall 52 is formed with a force transmitting surface 56 which is arranged opposite and parallel to the force transmitting surface 42 on the lug. The force transmitting surfaces 42, 56, as will be noted in FIG. 3, extend above the level of the rails and the surfaces are oriented angularly downward toward the rails so that the force exerted by the nut through the lug 41 is separated into two components: a first component which clamps a work piece inserted between the jaws and a second component which holds the movable jaw downwardly against the way surfaces 12*a*** on the rails.

Secured to the jaw 17 is a jaw plate, or face plate, 57 held in position by a pair of screws 58.

In accordance with the present invention there is interposed between the force transmitting surface 42 associated with the nut and the force transmitting surface 56 within the movable jaw, a spring assembly including a preloaded spring through which the force is resiliently transmitted from nut to jaw. The spring assembly, indicated generally at 60 (see also FIG. **8*a*) includes a cupped, or bellville, spring washer 61 and a flat steel washer 62 which is preferably hardened. Both washers are mounted on a guide pin 63 which is fitted into a hole 64 centrally drilled to intersect the force transmitting surface 56 of the movable jaw. For seating on the surface, the pin includes an integral flange 65 beyond which extends a projecting portion 66 having a tip 67 and over which the washers 61, 62** are telescoped.

Means interposed between the movable jaw and the lug are provided for prestressing the spring. In the present instance such prestressing is accomplished by a set screw 70 which is screwed into the front wall 51 of the jaw and which projects into the central space 55 to engage the lug 41 on the front side, opposite surface 42, forcing the lug relatively into engagement with the spring assembly and partially compressing the spring washer 61 to a degree set forth in FIG. **8*a***.

Figure 7:
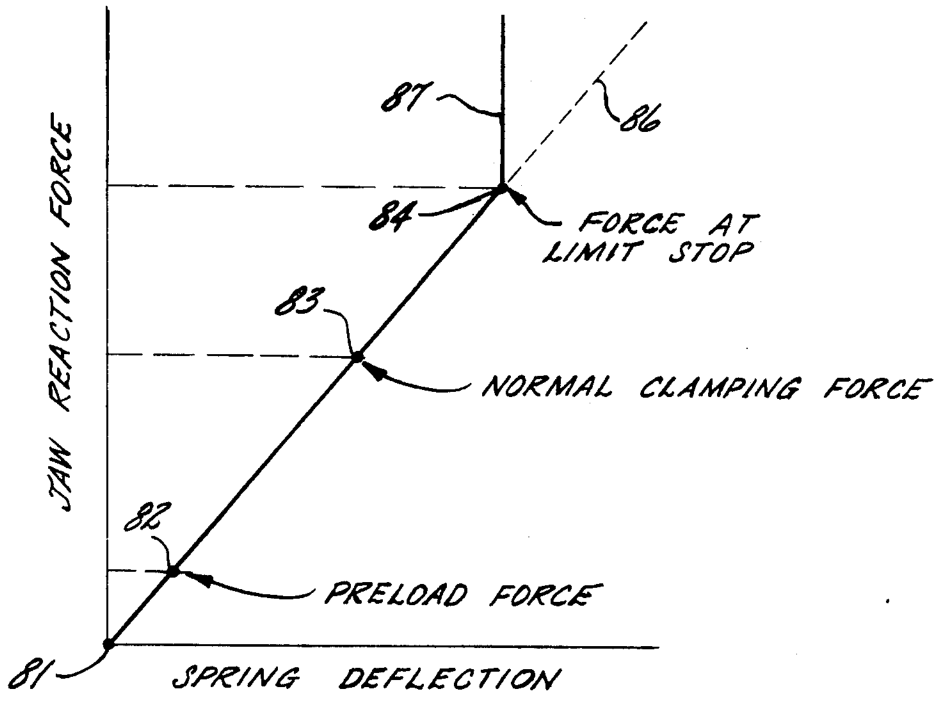
FIG. 7 is a diagram showing the nature of the spring force characteristic; and FIGS. **8*a* and 8*b*** are fragmentary cross-sections taken through the spring washer assembly, slightly exaggerated, and showing the condition of the spring washer under preload and clamping conditions, respectively.
Figure 8A:
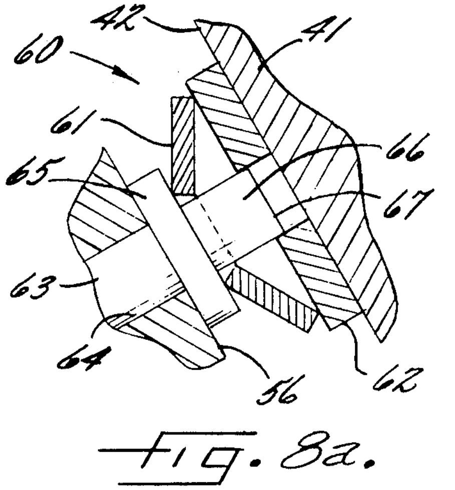
Figure 8B:
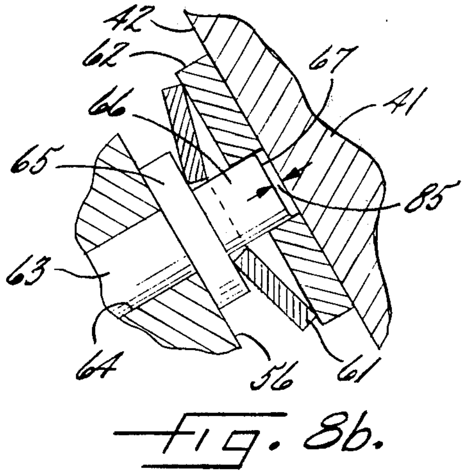

It is one of the features of the present invention that a spring is used which is of "flat" configuration, readily accommodated between the parallel force transmitting surfaces, and having a spring rate which is preferably linear or which may increase with compression, that is to say deflection, of the spring member. Referring to FIG. 7, there is set forth a stress strain characteristic of a type preferred in the practice of the present invention and which is generally characteristic of a cupped spring washer. The curve indicated at 80 has an origin 81, a preload condition 82, a clamping condition 83 and an over-stress threshold condition 84.

In the initial adjustment of the vise, the set screw 70 is screwed in, forcing the lug 41 into engagement with the flat washer 62 and compressing the spring washer 61 into the condition illustrated in FIG. **8*a*** at which a preload force is generated within the range of, say, 100 pounds to 500 pounds.

Such generation of preload has a number of advantages: In the first place, it develops a "pre-hold-down" force which serves to press the movable jaw down snugly and resiliently against the way surfaces **12*a*** on the rails, precluding any looseness of the movable jaw relative to the frame of the vise, even when the movable jaw is in its backed-off condition, free of any clamping force. This insures that there will be no vertical movement of the movable jaw as a work piece is engaged and clamped-up, in contrast to the more conventional construction in which vertical shifting of the jaw and hence the engaged work piece during clamp-up is a definite possibility.

A related advantage is that the preloaded spring takes up any play between the movable jaw and the traveling nut, and at the same time, by reason of the pre-hold-down force, prevents any looseness between the nut and the screw and between the screw and the frame — not only that which exists initially but that which may later tend to develop as a result of wear. In short, the spring produces an automatic take-up action to counteract any looseness in the drive and to insure the existence of a pre-hold-down force over the life of the vise. This is to be contrasted with the construction of the prior art, as exemplified in the above mentioned Muggli et al. patent, in which there is no pre-hold-down force and in which play, developing as a result of wear and usage, requires repeated readjustment, or take-up, of the set screw.

As a further important advantage of the present construction, the interposed spring enables the work piece to be gripped with an initial resilient force which, depending upon the degree of preload, is sufficiently high so that the work piece may be mounted in the vise in a preliminary way and shifted one way or the other into a final adjusted position by tapping lightly with a leaded hammer, following which the clamping screw may be turned to provide secure clamping pressure.

Because of the articulation between the movable vise jaw and the nut 40, which is permitted by the interposition of the spring washer 61 and by the play at the way surfaces **12*b***, the movable jaw is automatically self-aligned to the presented surface of the work piece, with the result that the force applied to the work piece is more equally distributed over the jaw area; in short, the work piece does not present any "hard spots" at which force is concentrated and about which the work piece might tend to pivot.

In use of the jack screw 15 is first lightly turned to engage the work piece, (with the work piece, if desired, being tapped or otherwise shifted into final position) following which the screw is additionally rotated until a reaction force is felt which is comparable to that of conventional machine vises not having the resilient feature. This serves to advance the operating point from the preload condition 82 (FIG. 7) to the normal clamping condition 83. Under the latter condition the work piece is positively, yet resiliently, held in working condition with proportional hold-down force being exerted between the movable jaw and the supporting way surface. The condition of the spring assembly under such conditions is illustrated in FIG. **8*b*. Note that the projecting portion 66 of the pin is preferably of such length, and the washer 62 is of such thickness, related to the reaction force characteristic of the spring, that under normal clamping conditions a gap, indicated at 85, exists between the tip 67 of the pin 63 and the presented surface 42** of the lug.

However, it is one of the more detailed features of the present invention that the tip 67 of the pin is employed as a stop for limiting the deflection of the spring element 61 in the event that the jack screw is overtightened. Thus, upon turning the screw beyond the point of normal reaction force, causing an increase in the clamping force from point 83 to point 84 (FIG. 7), the tip 67 of the pin advances toward the lug surface 42, consuming the clearance space 85, until bottoming occurs. The projecting length of the pin, and the thickness of the washer 62, are preferably such that bottoming will occur before the spring washer 61 is completely flat, thereby insuring that the elastic limit 86 of the washer will not be exceeded. Any tightening of the jack screw beyond the point of bottoming causes the force curve to depart from the characteristic 80 and to become substantially vertical as indicated at 87.

Figure 6:
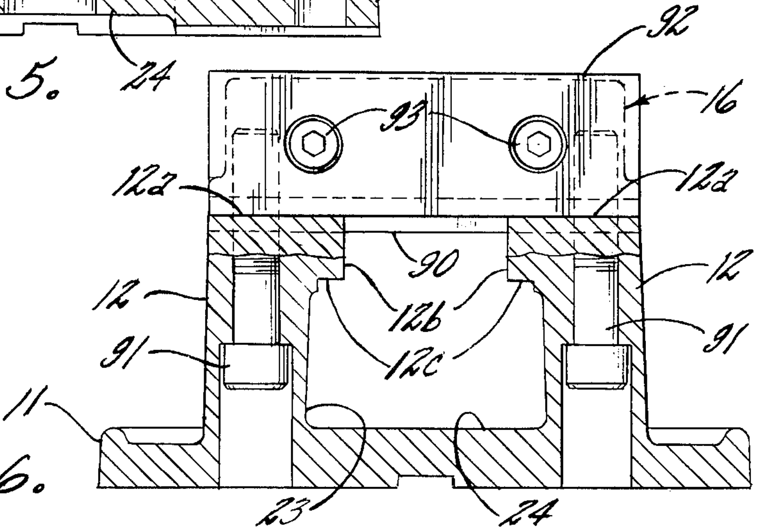
FIG. 6 is a vertical section taken along line 6—6 in FIG. 3.

For the sake of completeness, it should be noticed that the fixed jaw 16 is securely mounted upon the rails 12 to withstand any force which can be generated by the movable jaw 17. For precise location of the fixed jaw, it is keyed in position by transversely extending key 90, (FIGS. 3 and 6) with hold-down by a pair of screws 91. The fixed jaw has a face plate 92 which is secured to the jaw body by means of a pair of spaced screws 93.

It will be apparent that the present construction avoids the disadvantages of the prior art, while achieving additional operating advantages as already outlined. Specifically, the construction avoids the use of a hardened insert of spherical shape requiring the machining of a spherical pocket as taught in the prior art, machining which is both awkward and expensive compared to simply drilling a hole 64 (FIG. 3). The present construction, with its preload feature, not only achieves prehold-down and resilient clamping but completely avoids development of any play in the drive system, thus ending the necessity for constant readjustment of the set screw; indeed, the set screw may be permanently adjusted at the factory to provide the desired preload, which adjustment may be maintained for the normal life of the vise, thereby avoiding the possibility of overtightening of the set screw by a user in the field. The preloaded spring, because of its centered position in the structure, acts symmetrically upon the movable jaw so that when the jack screw is backed off, releasing pressure from the work piece, the movable jaw tends to occupy a nominally centered position, in readiness for articulation in one direction or the other, as a new work piece is engaged.

The construction is not only highly economical but inherently strong, capable of resiliently exerting clamping forces which are equal to or greater than conventional vises, but with the resilient element being fully protected against over-stress.

While the invention has been described in connection with a preferred form of the invention employing a cupped spring washer, it will be apparent that in that certain advantages of the structure may be achieved using other specific types of springs of flat configuration, even others having a rising spring rate, as, for example, a flat spring of well-known "wave" configuration. Indeed, it will be apparent to one skilled in the art that the invention is broad enough to include, as a substitute for the spring assembly 60, a flat block of rubber or rubberlike material interposed between the surfaces 42, 56, and with the block being congruently recessed if desired into one or both of the opposed surfaces to provide sufficient confinement as to produce a constant or rising spring rate as well as bottoming protection.

While the preferred construction includes captive rotation of the jack screw 15 in the frame of the vise, with threaded driving engagement between the screw and the nut, it will be understood that these functions may be reversed if desired, without departing from the invention, by providing threaded engagement between the screw and the frame, and rotational captivity between the remote end of the screw and the "nut" element 40, boty types of jaw propulsion being in commun usage in prior constructions.

We claim:

1. In a precision machine vise, the combination comprising a frame including a base and opposed horizontally extending rails having way surfaces, a cross member joining the rails at one end thereof, a fixed jaw bridging the rails at the opposite end, a movable jaw slideably superimposed on the rails for cooperating with the fixed jaw, a horizontal jack screw captively journaled in the cross member, a traveling nut on the jack screw between the rails, the movable jaw having a recess in its underside, the traveling nut having a rigid lug extending upwardly into the recess, the movable jaw and the lug having opposed force transmitting surfaces, a spring member interposed between the force transmitting surfaces, means interposed between the nut and the movable jaw for preloading the spring member, the spring member being oriented to apply a downward component of force between the movable jaw and the rails while permitting limited articulation between the movable jaw and the nut for self-alignment of the movable jaw with the presented surface of a work piece.

2. In a precision machine vise, the combination comprising a frame including a base and opposed horizontally extending rails having way surfaces, a cross member joining the rails at one end thereof, a fixed jaw bridging the rails at the opposite end, a movable jaw slidably superimposed on the rails for cooperating with the fixed jaw, a horizontal jack screw captively journaled in the cross member, a traveling nut on the jack screw between the rails, the movable jaw having a recess in its underside, the traveling nut having a rigid lug extending upwardly into the recess, the movable jaw and the lug having opposed parallel force transmitting surfaces, a spring of flat configuration interposed between the force transmitting surfaces, means interposed between the nut and the movable jaw for preloading the spring, the spring being oriented to apply a downward component of force between the movable jaw and the rails, while permitting limited articulation between the movable jaw and the nut for self-alignment of the movable jaw with the presented surface of a work piece, and stop means for bottoming the surfaces together prior to exceeding the elastic limit of the spring.

3. In a precision vise, the combination comprising a frame including a base and opposed horizontally extending rails having way surfaces, a cross member joining the rails at one end thereof, a fixed jaw bridging the rails at the opposite end, a movable jaw slideably superimposed on the rails for cooperating with the fixed jaw, a horizontal jack screw captively journaled in the cross member, a traveling nut on the jack screw between the rails, the movable jaw having a recess in its underside, the traveling nut having a rigid lug extending upwardly into the recess, the movable jaw and the lug having opposed force transmitting surfaces substantially parallel to one another, a cupped spring washer interposed between the surfaces, a pin mounted in one of the surfaces and projecting a shallow distance therefrom for registering with the cupped washer to maintain the same in a centered position, and means on the movable jaw and engaging the opposite side of the lug for taking up any axial play between the lug and the movable jaw and for prestressing the spring washer.

4. In a precision machine vise, the combination comprising a frame including a base and opposed horizontally extending rails having way surfaces, a cross member joining the rails at one end thereof, a fixed jaw bridging the rails at the opposite end, a movable jaw slideably superimposed on the rails for cooperating with the fixed jaw, a horizontal jack screw captively journaled in the cross member, a traveling nut on the jack screw between the rails, the movable jaw having a recess in its underside, the traveling nut having a rigid lug extending upwardly into the recess, the movable jaw and lug having opposed parallel force transmitting surfaces, a spring member of flat configuration interposed between the surfaces, means interposed between the movable jaw and the nut for prestressing the spring member, the force transmitting surfaces being oriented downwardly at an angle with respect to the rails so that force is exerted by the movable jaw resiliently downward against the rails (a) at a light constant level prior to engagement of a work piece, and (b) at a proportionately increasing level as increased clamping force is applied to the work piece.

5. In a precision machine vise, the combination comprising a body including a frame and opposed horizontally extending rails having way surfaces, a cross member joining the rails at one end thereof, a fixed jaw bridging the rails at the opposite end, a movable jaw slideably superimposed on the rails for cooperating with the fixed jaw, a horizontal jack screw captively journaled in the cross member, a traveling nut on the jack screw between the rails, the movable jaw having a recess in its underside, the traveling nut having a rigid lug upwardly into the recess, the movable jaw and the lug having opposed force transmitting surfaces oriented angularly downward with respect to the rails, a guide pin laterally centered on one of the force transmitting surfaces and projecting outwardly therefrom, a cupped spring washer telescoped over the guide pin, a set screw threaded in the movable jaw and engaging the lug on its opposite side for moving the force transmitting surfaces toward one another and thereby prestressing the spring washer so that a hold-down force is applied to the movable jaw while it is free of a work piece so that when a work piece is engaged by the movable jaw a resilient clamping force is applied thereto with a proportionately augmented resilient force being applied by the jaw downwardly against the rails.

6. The combination as claimed in claim 5 in which the guide pin is mounted in a hole in the movable jaw, the guide pin having a flange thereon for engaging the force transmitting surface on the movable jaw, the cupped spring washer being seated on the flange, and a flat washer telescoped over the top of the pin and seated against the spring washer and engaging the force transmitting surface on the lug.

7. The combination as claimed in claim 5 in which the guide pin is of such length that the tip thereof is capable of bottoming on the opposite force transmitting surface incident to deflection of the spring to a point approaching the elastic limit.

8. The combination as claimed in claim 1 in which the spring is of a type in which the spring rate increases upon increasing deflection or is substantially constant.

9. In a precision machine vise, the combination comprising a body including a body and opposed horizontally extending rails having way surfaces, a cross member between the rails at one end thereof, a fixed jaw bridging the rails at the other end, a movable jaw slideably superimposed on the rails for cooperating with the fixed jaw, a horizontal jack screw captively journaled in the cross member, a traveling nut on the jack screw between the rails, the movable jaw and the lug having opposed force transmitting surfaces, a spring member interposed between the force transmitting surfaces, means interposed between the movable jaw and the nut for preloading the spring member, the spring member being oriented so that a component of the preload force is applied downwardly by the movable jaw against the rails for taking up any looseness of the movable jaw and for maintaining it constantly and intimately seated on the rails, the spring member being centered with respect to the movable jaw thereby to serve as a pivot permitting limited articulation between the movable jaw and the nut for self-alignment of the movable jaw with the presented surface of a work piece.

* * * * *